United States Patent [19]

Jacobs

[11] 4,151,025
[45] Apr. 24, 1979

[54] METHOD FOR WATERPROOFING BRIDGE DECKS AND THE LIKE

[75] Inventor: Melvin J. Jacobs, Sharon, Mass.

[73] Assignee: Triram Corporation, Framingham, Mass.

[21] Appl. No.: 803,789

[22] Filed: Jun. 6, 1977

[51] Int. Cl.² .................... E04B 2/00; E01D 19/12; E01C 3/06

[52] U.S. Cl. .................................... 156/71; 14/73; 404/31; 404/72

[58] Field of Search .................. 156/71; 428/266, 265, 428/267, 268, 248, 250; 404/18, 31, 32, 72, 82; 14/1, 73, 74

[56] References Cited

U.S. PATENT DOCUMENTS

| | | | |
|---|---|---|---|
| 1,426,672 | 8/1922 | Radford | 156/129 |
| 1,958,871 | 5/1934 | Tucker | 404/31 |
| 2,499,724 | 3/1950 | Compton | 428/250 |
| 2,672,793 | 3/1954 | Rowe et a. | 404/82 |
| 2,690,769 | 10/1954 | Brown | 428/250 |
| 2,695,257 | 11/1954 | Castellani | 156/71 |
| 3,603,221 | 9/1971 | Barton et al. | 404/31 |
| 3,741,856 | 6/1973 | Hurst | 404/32 |
| 3,933,566 | 1/1976 | Seiberling et al. | 156/272 |
| 4,005,954 | 2/1977 | Hinsche et al. | 156/71 |

Primary Examiner—Douglas J. Drummond
Attorney, Agent, or Firm—Morse, Altman, Oates & Bello

[57] ABSTRACT

Concrete bridge decks are waterproofed by first applying a primer over sound, dry and clean concrete which forms the bridge deck. A laminated membrane is then installed over the primed concrete surface, the membrane being comprised of reinforced cured and uncured elastomers. The membrane is then heated to the point where the uncured elastomer flows and rolled prior to cooling. A tack coat is then applied over the membrane and a wearing surface, such as asphalt, or the like, applied.

The membrane employed is comprised of an upper stratum of a cured elastomer, a reinforcing fabric such as woven fiberglass in the center thereof and a lower stratum of a soft, uncured, form stable elastomer adapted to flow on the application of heat.

19 Claims, 5 Drawing Figures

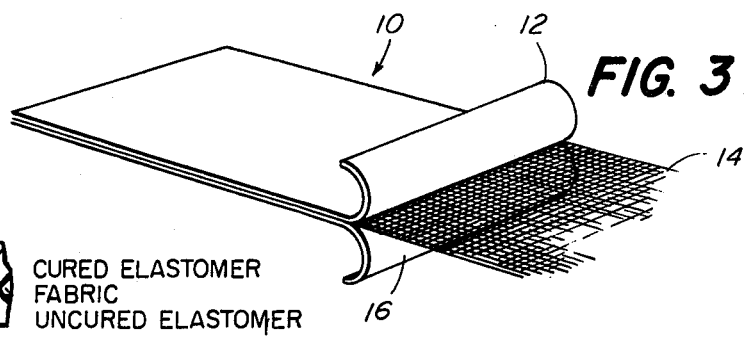
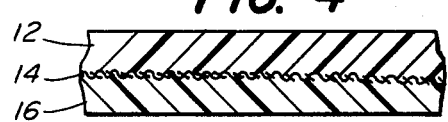
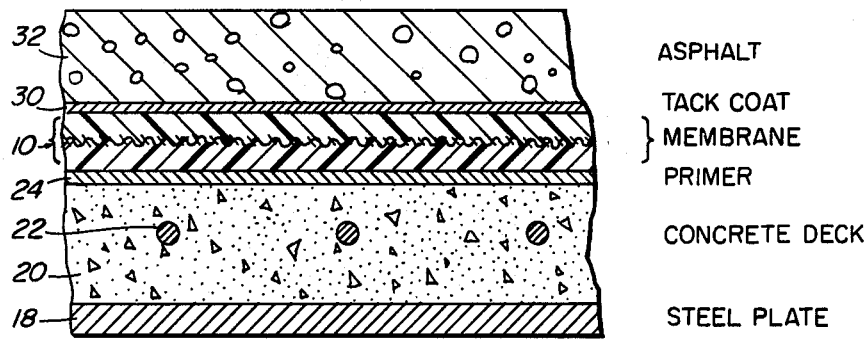
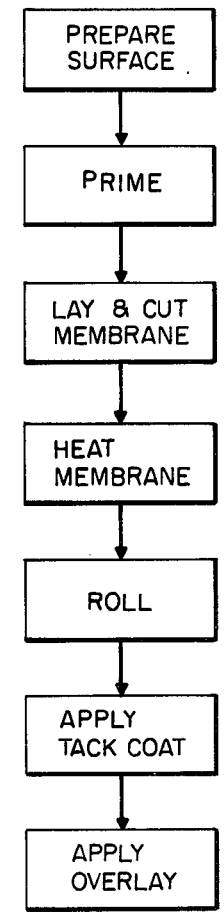
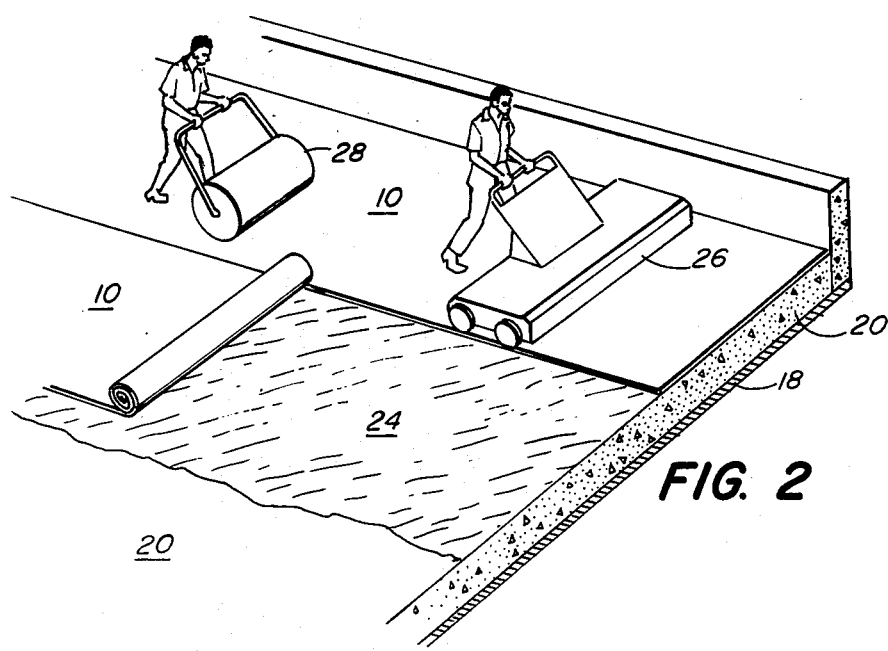

METHOD FOR WATERPROOFING BRIDGE DECKS AND THE LIKE

BACKGROUND OF THE INVENTION

1. Field of the Invention

This invention relates generally to a method and material for waterproofing surfaces such as bridge decks, and the like, and more particularly is directed towards a new and improved membrane for use in waterproofing a bridge deck or the like and the method of installing the membrane.

2. Description of the Prior Art

In the highway construction and maintenance field, serious problems have existed for many years with respect to the decks of bridges, overpasses, and the like, especially those constructed with a cement/concrete bed and an asphalt wearing surface. Although such structures are commonly used, they experience maintenance problems resulting from water leakage passing through the asphalt into the concrete deck. Such leakage commonly results in damage to the deck as the result of the water freezing and expanding to cause cracks in the concrete during the winter, and if the highway has been salted, the leaks can result in rusting of reinforcement rods, deck plates and other ferrous metal parts. Also, moisture trapped within the deck or in the inner face between the deck and the asphalt may expand when heated, causing the asphalt to lift and crack.

Various attempts have been made to solve the problem but none of these has been entirely successful from the standpoint of effectiveness, cost, ease of installation and durability. Various coatings have been employed but have not provided a durable, fully waterproofed layer over the entire surface. Various sheet materials have also been utilized but these have been difficult to install and have not bonded well to the deck and frequently form air pockets when entrained moisture becomes heated during warm periods.

Accordingly, it is an object of the present invention to provide a new and improved membrane for use in waterproofing bridge decks, and the like. Another object of this invention is to provide an improved method for waterproofing bridge decks and the like.

SUMMARY OF THE INVENTION

This invention features the method of waterproofing bridge decks, and the like, comprising the steps of applying a primer coat to a clean, dry deck, installing a flexible waterproof membrane over the primer coat, the membrane being comprised of an upper stratum of cured elastomer, a center fabric ply, and a bottom stratum of uncured elastomer. Once installed, the membrane is heated to a point sufficient to cause the uncured stratum of elastomer to flow, then rolled, followed by a tack coat and a wear surface of asphalt, or the like. This invention also features a membrne for use in waterproofing a bridge deck, or the like, comprising a three-ply, flexible waterproof sheet including an open mesh, flexible center ply, an upper ply of a cured, oil-resistant elastomer, and a bottom ply of a soft, uncured, form stable elastomer adapted to flow upon the application of heat.

BRIEF DESCRIPTION OF THE DRAWINGS

FIG. 1 is a flow diagram summarizing the sequence of steps involved in carrying out the invention, FIG. 2 is a perspective view showing a typical installation procedure, FIG. 3 is a view in perspective showing a section of membrane made according to the invention, FIG. 4 is a sectional detailed view of the membrane, and, FIG. 5 is a detailed sectional view of a typical bridge deck membrane installation.

DETAILED DESCRIPTION OF THE PREFERRED EMBODIMENTS

Referring now to the drawings, the reference character 10 generally indicates a membrane having particular utility in forming a waterproof layer on a bridge deck or the like. The membrane is used to waterproof cement/concrete bridge decks prior to a wearing surface being applied thereto and may also be employed in waterproofing other types of cement/concrete structures such as roofs, for example. The membrane is a flexible, imperforate, waterproof sheet material typically provided in rolls and, in practice, has a thickness on the order of 1/16". The thickness is not critical and may be increased or decreased although for use on bridge decks the thickness should not be less than 0.062".

The membrane is comprised of three strata, namely, an upper stratum 12, an inner stratum 14, and a bottom stratum 16. The upper stratum 12, in the preferred form of the invention, is a cured, oil-resistant elastomer which can be any natural or synthetic formulation and preferably it is based on neoprene rubber, carbon black and reinforcing fillers at a rubber hydrocarbon content of not less than 30%. Typically, the cured neoprene stratum 12 has a thickness on the order of 0.008".

The center stratum 14 is a reinforcing fabric material which can be a synthetic material such as polyethylene, polypropolene, polyamide, or polyester, glass, or a natural product such as cotton. Preferably, the fabric has a relatively open mesh with the interstices being on the order of $\frac{1}{8}$" to 1/16". The fabric may be woven and is coextensive with the upper stratum 12. A 20×10 glass scrim with a plain weave has been found satisfactory.

The bottom stratus 16 provides a soft, form stable heat flowable layer that can be any natural, synthetic or reclaimed rubber formulation and preferably it is based on a low unsaturation polyisobutylene-isoprene copolymer (butyl) or a polyisobutylene (PIB), carbon black, reinforcing and extending fillers, processing oils at a rubber hydrcarbon content of not less than 20%. Typically, the thickness of the stratum 16 is on the order of 0.054".

The laminate 10 is preferably unbalanced with the preponderance of the total thickness made up of the soft, heat flowable layer 16 with a preferred thickness of 0.045" minimum. The membrane material, which has been found to be particularly satisfactory for bridge deck work has a total thickness of 0.062" using a plain weave 20×10 glass scrim, and an upper stratum of 0.008" cured neoprene, and a bottom stratum of 0.054 uncured butyl.

The membrane is installed on a bridge deck or similar structure by first preparing the deck surface which must be sound, dry and clean. In a typical bridge deck structure, a bottom steel plate 18, which may be supported on girders, or the like, carries a relatively thick concrete deck 20. Typically, the cement/concrete deck 20 is reinforced by iron or steel reinforcing rods 22 laid out in a grid pattern. Starting with a sound, dry, clean deck 20, a primer coat 24 is applied over the deck 20 and typically at a coverage rate of perhaps 200 sq. feet per gallon of primer. The primer in the preferred embodiment is a butyl solvent and serves to make the butyl-concrete interface more compatible and enhance the bonding action when heat is applied. Once the primer layer 24 has been applied, the membrane 10 is installed.

Typically, the membrane 10 is provided in roll form and is installed by merely rolling out the membrane in strips or courses, as suggested in FIG. 2. The membrane may be cut to fit as necessary to insure that the membrane is coextensive with the deck surface. The material is soft and may be cut with shears or a sharp knife to provide a neat fit against curbs around drain holes or the like. Once a course of the membrane has been laid out and fitted in place, it is heated to a temperature of approximately 175° F. This may be done by various types of heaters, and in the FIG. 2 embodiment a mobile heater 26 is moved across the top surface of the membrane. The heater 26 preferably is a radiant type heater using infrared lamps, although other types of heaters may also be used, and numerous types of heating units are available for this purpose. In any event, the membrane is heated to about 175° F. at which temperature the bottom uncured stratum 16 will flow to an extent sufficient for the stratum 16 to intimately bond with the top surface of the deck 20, forming an extremely tight integument which is highly waterproof and tightly secured to the deck.

While the membrane is still in this heated condition, it is pressed down, preferably by means of a hand roller 28 to insure that all air bubbles are rolled out from between the deck and the membrane before the material has cooled. Once one course of membrane has been installed, a second course or strip is applied. The same sequence is followed with a primer coat being first applied, followed by the laying out of the membrane. The adjacent courses should overlap one another preferably by at least 2" to insure a continuous membrane surface over the deck. The second course, once installed, is heated and rolled and successive courses added until the deck is fully covered.

Once the membrane has been fully installed, a tack coat is applied on top of the membrane. The tack coat in the preferred embodiment is an asphalt emulsion typically comprised of 65% asphalt and 45% emulsifiers and water by weight. Once the tack coat 30 has been applied, the wearing surface, such as a bituminous concrete overlay 32, is placed directly on top of the tack coated membrane. The bituminous concrete is installed in accordance with usual practice. Typically, the hot top is applied at about 300° F. When installing the membrane, ambient temperature preferably should be at least 45° F. in order to allow the membrane to be properly heated and to retain heat long enough for the membrane to be rolled to remove air bubbles.

The membrane made in accordance with the present invention is characterized by a puncture resistance of 67.7-72.2 per ASTM EL 54. The membrane will pass the cold crack at 15° F. per ASTM D146. The membrane is sufficiently tough that it does not require any protective course prior to the overlay of bituminous concrete and it may have a track paver riding directly on its surface.

While the invention has been described with particular reference to the illustrated embodiments, numerous modifications thereto will appear to those skilled in the art. For example, membrane may be used for waterproofing other structures such as roofs of buildings of various types, or other structures where a highly efficient waterproofing surface is required.

Having thus described the invention, what I claim and desire to obtain by Letters Patent of the United States is:

1. The method of waterproofing concrete bridge decks and the like, comprising the steps of
 (a) applying a preformed heat softenable, waterproof, flexible sheet membrane over the upper surface of said deck,
 (b) applying sufficient heat to said membrane to cause at least that portion of said membrane against said deck to flow into binding adhesion with said deck, and
 (c) applying a wear stratum over said membrane,
 (d) said membrane being comprised of an upper ply of a cured elastomer and a lower ply of an uncured elastomer.

2. The method of claim 1, including the step of applying a solvent primer coat over the upper surface of said deck prior to applying said membrane.

3. The method of claim 2, including the step of moving a roller over said membrane after applying said membrane while said membrane is heated to remove trapped air therefrom.

4. The method of claim 3, including the step of adding a tack coat to the upper surface of said membrane prior to applying said wear stratum.

5. The method of claim 4 wherein said tack coat is an asphalt emulsion.

6. The method of claim 1 wherein said wear stratum is bituminous concrete.

7. The method of claim 1 wherein said upper ply is neoprene and said lower ply is butyl.

8. The method of claim 7 wherein said membrane includes a woven ply between said upper and lower plies.

9. The method of waterproofing concrete brige decks, and the like, comprising the steps of
 (a) applying a heat-sensitive, waterproof, flexible membrane over the upper surface of said deck,
 (b) applying sufficient heat to said membrane to cause at least that portion of said membrane against said deck to flow into binding adhesion with said deck, and
 (c) applying a wear stratum over said membrane,
 (d) said membrane being comprised of an upper ply of cured elastomer, a center ply of fabric and a lower ply of uncured elastomer.

10. The method of claim 9 wherein said upper ply is neoprene, said center ply is woven and said lower ply is butyl.

11. The method of claim 10 wherein said primer is a butyl solvent.

12. The method of claim 9 including the step of applying a solvent primer coat over the upper surface of said deck prior to applying said membrane.

13. The method of claim 12 including the step of moving a roller over said membrane after applying heat to said membrane while said membrane is still hot to remove trapped air therefrom.

14. The method of claim 12 wherein said primer is a butyl solvent.

15. The method of claim 13 including the step of adding a tack coat to the upper surface of said membrane prior to applying said wear stratum.

16. The method of claim 15 wherein said tack coat is an asphalt emulsion.

17. The method of claim 9 wherein said upper ply is woven and said lower ply is butyl.

18. The method of claim 9, wherein said wear stratum is a bitumous concrete.

19. The method of waterproofing concrete bridge decks, and the like, comprising the steps of
   (a) applying a solvent primer coat over the upper surface of said deck,
   (b) applying a heat softenable waterproof, flexible, sheet membrane over the primer coated surface of said deck,
   (c) applying sufficient heat to said membrane to cause at least that portion of said membrane against said primer-coated deck to flow into binding adhesion with said deck, and
   (d) applying a wear stratum over said membrane,
   (e) said membrane being of a multi-strata construction with the lower stratum thereof being an uncured elastomer.

* * * * *